(12) United States Patent
Zhao et al.

(10) Patent No.: US 11,314,286 B2
(45) Date of Patent: *Apr. 26, 2022

(54) ELECTRONIC DEVICE, METHOD AND APPARATUS FOR CONTROLLING FLEXIBLE PANEL

(71) Applicant: Beijing Xiaomi Mobile Software Co., Ltd., Beijing (CN)

(72) Inventors: Ming Zhao, Beijing (CN); Gaocai Han, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 8 days.

This patent is subject to a terminal disclaimer.

(21) Appl. No.: 17/134,917

(22) Filed: Dec. 28, 2020

(65) Prior Publication Data

US 2021/0116973 A1 Apr. 22, 2021

Related U.S. Application Data

(62) Division of application No. 16/697,675, filed on Nov. 27, 2019, now Pat. No. 10,915,146.

(30) Foreign Application Priority Data

May 20, 2019 (CN) .......................... 201910419119.5

(51) Int. Cl.
*G06F 1/16* (2006.01)
*G06F 3/01* (2006.01)
(52) U.S. Cl.
CPC .......... *G06F 1/1652* (2013.01); *G06F 1/1686* (2013.01); *G06F 1/1692* (2013.01); *G06F 3/016* (2013.01); *G06F 3/017* (2013.01)
(58) Field of Classification Search
CPC ....................................................... H05K 5/00
See application file for complete search history.

(56) References Cited

U.S. PATENT DOCUMENTS 10,225,515 B1 3/2019 Sun
2014/0092566 A1* 4/2014 Shirasaka ............. G06F 1/1616
361/749

(Continued)

FOREIGN PATENT DOCUMENTS

| CN | 108600428 A | 9/2018 |
| CN | 108924296 | 11/2018 |
| CN | 109756594 A | 5/2019 |

OTHER PUBLICATIONS

Partial European Search Report dated Jun. 15, 2020 in corresponding European Patent Application No. 19215150.4, 17 pages (Continued)

*Primary Examiner* — Jerry Wu
(74) *Attorney, Agent, or Firm* — Oblon, McClelland, Maier & Neustadt, L.L.P.

(57) ABSTRACT

An electronic device is provided. The electronic device includes a device body including a plurality of sensor components arranged in a longitudinal line along a first direction; a flexible panel including a display region and a light transmitting region connected with the display region; and a drive mechanism configured to drive the flexible panel to move along a second direction. When at least one of the sensor components is in an operating state, the light transmitting region covers the plurality of sensor components, where the first direction is perpendicular to the second direction, where the drive mechanism includes: a drive motor; and a transmission device mating with the drive motor and including a transmission component that engages with the flexible panel; the light transmitting region includes a first light transmitting region connected with one side of the display region and a second light transmitting region connected with the other side of the display region opposite to the first light transmitting region; the transmission component includes a first transmission component winding at (Continued)

least a portion of the first light transmitting region and a second transmission component winding at least a portion of the second light transmitting region.

6 Claims, 9 Drawing Sheets

(56) References Cited

U.S. PATENT DOCUMENTS

2014/0362513 A1* 12/2014 Nurmi ................ G06F 1/1652
                                                    29/401.1
2019/0302847 A1    10/2019 Chen et al.

OTHER PUBLICATIONS

Extended European Search Report issued in European Application No. 19/215,150.4 dated Oct. 15, 2020.

* cited by examiner

000# ELECTRONIC DEVICE, METHOD AND APPARATUS FOR CONTROLLING FLEXIBLE PANEL

CROSS REFERENCE TO RELATED APPLICATIONS

This application is a divisional application of U.S. patent application Ser. No. 16/697,675 filed on Nov. 27, 2019, which claims priority to Chinese Patent Application No. 201910419119.5 entitled "ELECTRONIC DEVICE, METHOD AND APPARATUS FOR CONTROLLING FLEXIBLE PANEL" filed on May 20, 2019. The contents of these applications are hereby incorporated by reference in their entireties.

TECHNICAL FIELD

The present disclosure relates to the field of terminal technology, and in particular to an electronic device, a method and an apparatus for controlling a flexible panel.

BACKGROUND

At present, with continuous expansion and optimization of various functions of electronic devices, users have put forward higher requirements on the size of display region on the electronic devices. In the related art, a light transmitting region corresponding to a camera module may be disposed on a screen. Although the size of the display region may be increased to some extent, it fails to realize a real full screen display due to the existence of the light transmitting region which may not be used for display.

SUMMARY

The present disclosure provides an electronic device to overcome the deficiencies in the related art.

According to a first aspect of the present disclosure, an electronic device is provided. The electronic device includes a device body including a plurality of sensor components arranged in a longitudinal line along a first direction; a flexible panel including a display region and a light transmitting region connected with the display region; and a drive mechanism configured to drive the flexible panel to move along a second direction. When at least one of the sensor components is in an operating state, the light transmitting region covers the plurality of sensor components, where the first direction is perpendicular to the second direction, where the drive mechanism includes: a drive motor; and a transmission device mating with the drive motor and including a transmission component that engages with the flexible panel; the light transmitting region includes a first light transmitting region connected with one side of the display region and a second light transmitting region connected with the other side of the display region opposite to the first light transmitting region; the transmission component includes a first transmission component winding at least a portion of the first light transmitting region and a second transmission component winding at least a portion of the second light transmitting region.

The technical solutions provided by the examples of the present disclosure may include the following beneficial effects.

As can be known from the above examples, the arrangement direction of the plurality of sensor components in the present disclosure is perpendicular to the moving direction of the flexible panel. With the electronic device having both a light sensing function and a full screen display function, when the electronic device is in the light sensing state, an area occupied by the plurality of sensor components is reduced, which is advantageous to improving the aesthetics of the electronic device.

It is to be understood that the above general descriptions and the subsequent detailed descriptions are merely illustrative and explanatory, and are not intended to limit the present disclosure.

BRIEF DESCRIPTION OF DRAWINGS

The accompanying drawings, which are incorporated into and constitute a part of the specification, illustrate examples consistent with the present disclosure and serve to explain the principles of the present disclosure together with the specification.

DETAILED DESCRIPTION

Figure 1:
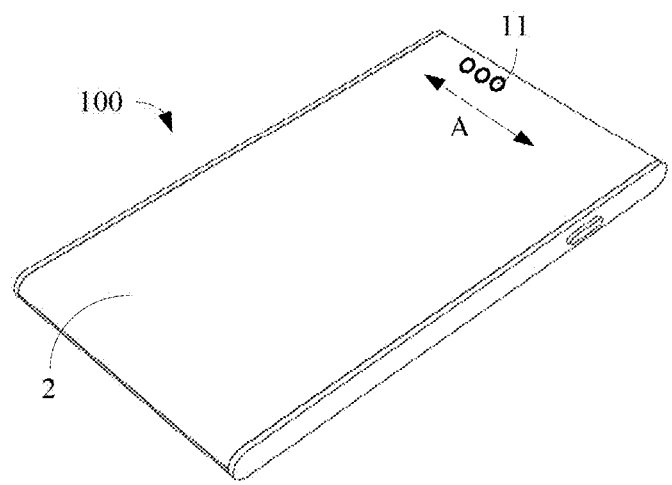
FIG. 1 is a schematic structural view illustrating an electronic device according to an exemplary embodiment.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as "first", "second", "third", etc. in the present disclosure, the information are not limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "in response to a determination that".

Figure 2:
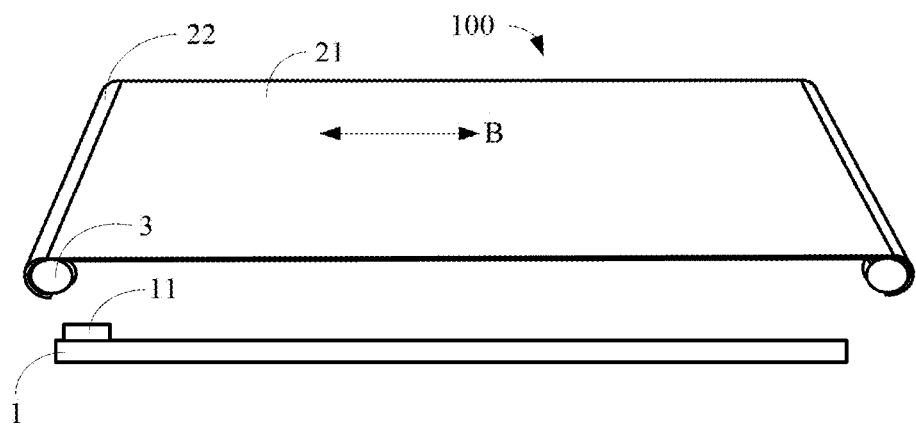
FIG. 2 is a schematic exploded view illustrating an electronic device according to an exemplary embodiment.

FIG. 1 is a schematic structural view illustrating an electronic device 100 according to an exemplary embodiment, and FIG. 2 is a schematic exploded view illustrating an electronic device 100 according to an exemplary embodiment. As shown in FIGS. 1 and 2, the electronic device 100 may include a device body 1, a flexible panel 2, and a drive mechanism 3. The device body 1 may include a plurality of sensor components 11 that may be arranged in a line along a first direction (as indicated by an arrow A in FIG. 1). Each sensor component 11 may include one of a camera module, a distance sensing module, an ambient light sensing module and a face recognition module, or the sensor component 11 may further include other light sensors, and the present disclosure has no limitation thereto. In addition to the sensor component 11, the device body 1 may further include a battery, a mainboard and other electronic elements.

As shown in FIG. 2, the flexible panel 2 may include a display region 21 and a light transmitting region 22 connected with the display region 21. The display region 21 may be used to display image and information, and the light transmitting region 22 may allow external light to enter an interior of the electronic device 100 or light emitted from the interior of the electronic device 100 may also exit the electronic device 100 through the light transmitting region 22. The drive mechanism 3 may engage with the flexible panel 2 to drive the flexible panel 2 to move along a second direction (as indicated by an arrow B in FIG. 2) so that when at least one of the plurality of sensor components 11 is in an operating state, the light transmitting region 22 covers the plurality of sensor components 11 by the movement of the flexible panel 2. The first direction and the second direction are perpendicular to each other. With the electronic device 100 having both a light sensing function and a full screen display function, when the electronic device 100 is in the light sensing state, an area of the display region 21 occupied by the plurality of sensor components 11 is reduced, which is advantageous to improving the aesthetics of the electronic device 100.

Figure 3:
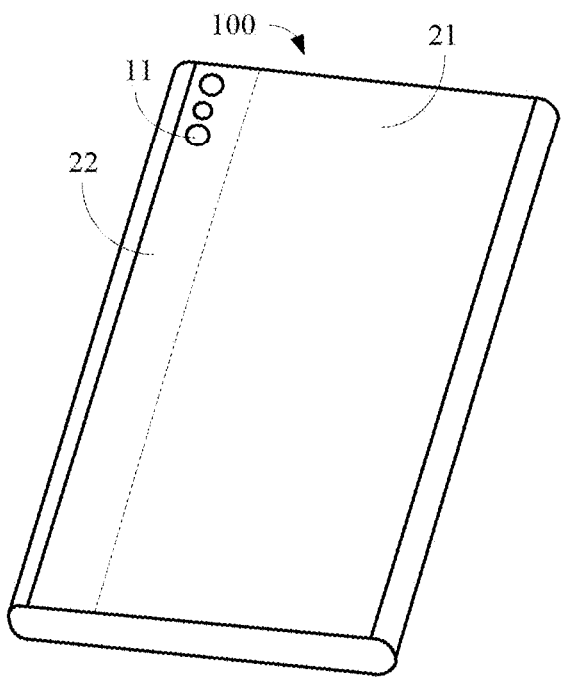
FIG. 3 is a schematic structural view illustrating another electronic device according to an exemplary embodiment.

In an embodiment, as shown in FIG. 3, the plurality of sensor components 11 may also be arranged along the second direction of the electronic device 100. As can be known from current users' habits for electronic devices, when the plurality of sensor components 11 are disposed at a side edge of the electronic device 100 along the second direction, the visual abruptness may be reduced and the sensory effect of the electronic device 100 may be enhanced as compared with a configuration in which the plurality of sensor components 11 are disposed at a top edge of the electronic device 100 along the first direction.

Figure 4:
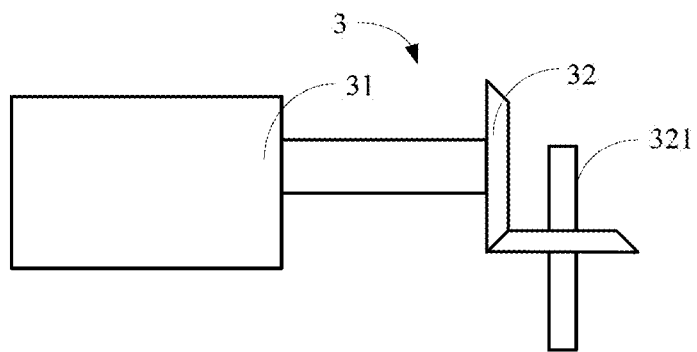
FIG. 4 is a schematic structural view illustrating a drive mechanism according to an exemplary embodiment.

Further, as shown in FIG. 4, the drive mechanism 3 may include a drive motor 31 and a transmission device 32. The transmission device 32 may mate with the drive motor 31, and the transmission device 32 may further include a transmission component 321 engaging with the flexible panel 2 so as to drive the flexible panel 2 to move via the transmission component 321. The transmission component 321 may include one or more of the following groups: a plurality of rotation shafts, a plurality of tracks and a plurality of belts arranged in parallel, and the present disclosure has no limitation thereto.

Figure 5:
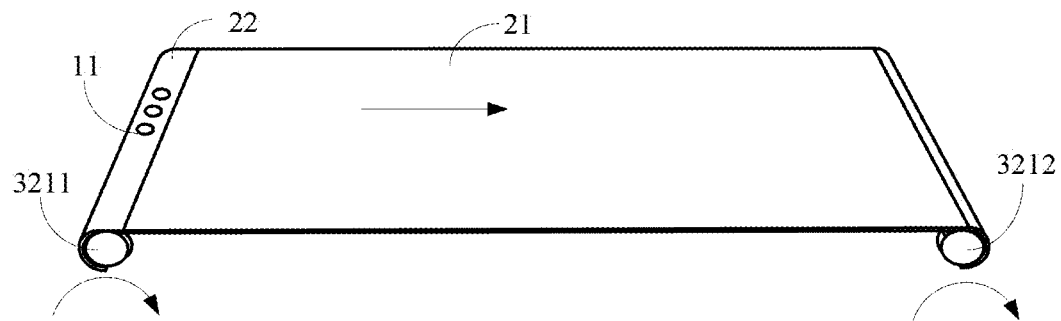
FIG. 5 is a schematic state view illustrating an electronic device according to an exemplary embodiment.
Figure 6:
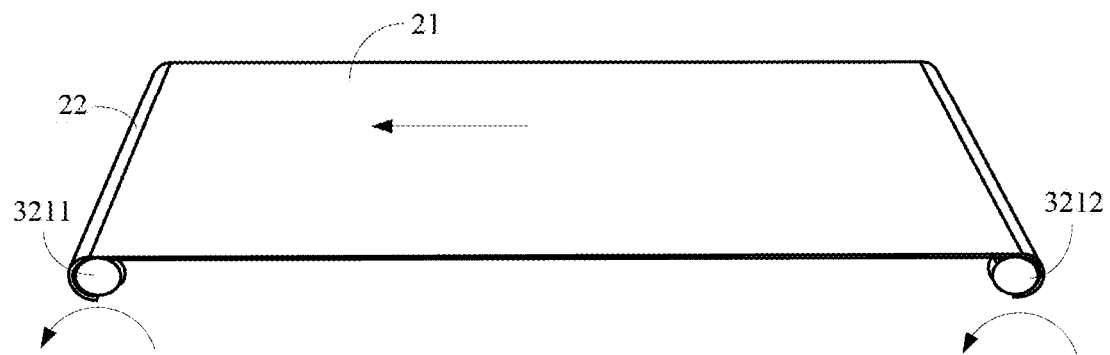
FIG. 6 is another schematic state view illustrating an electronic device according to an exemplary embodiment.
Figure 7:
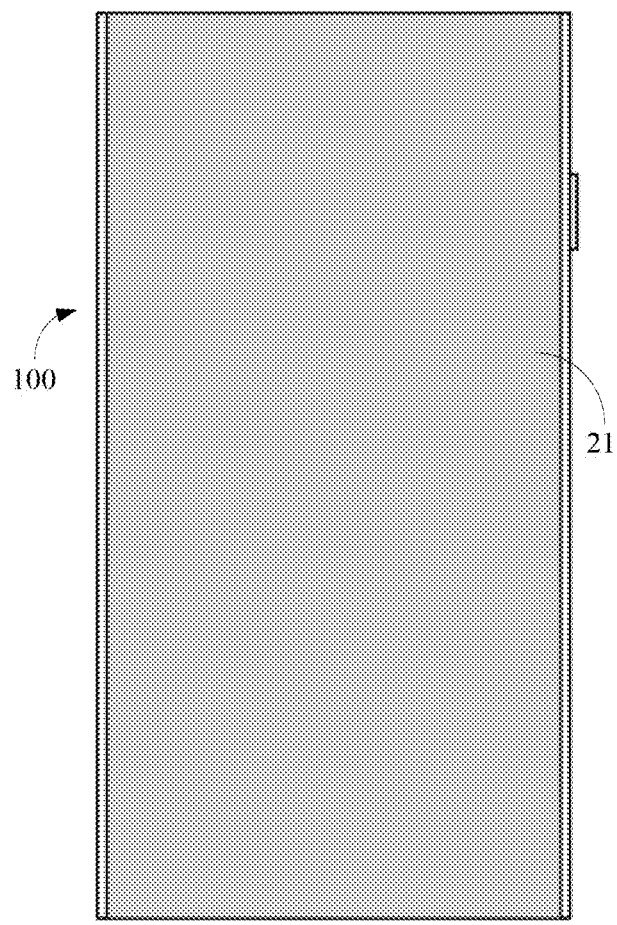
FIG. 7 is a schematic structural view illustrating still another electronic device according to an exemplary embodiment.

For example, as shown in FIG. 5, the transmission component 321 may include a plurality of rotation shafts arranged in parallel. For example, the transmission component 321 may include a first rotation shaft 3211 and a second rotation shaft 3212. When the first rotation shaft 3211 and the second rotation shaft 3212 are rotating in a clockwise direction, the display region 21 moves from a left side to a right side as shown in FIG. 5, and the light transmitting region 22 connected to the left side of the display region 21 may synchronously move to the right side, thereby making the display region 21 away from the sensor components 11 and the light transmitting region 22 cover the sensor components 11. As shown in FIG. 6, when the first rotation shaft 3211 and the second rotation shaft 3212 are rotating in a counter-clockwise direction, the display region 21 moves from the right side to the left side as shown in FIG. 6, and the light transmitting region 22 connected to the left side of the display region 21 may synchronously move to the left side, thereby making the light transmitting region 22 away from the sensor components 11 and the display region 21 cover the sensor components 11. The electronic device 100 may be switched to a full screen display state as shown in FIG. 7.

Figure 8:
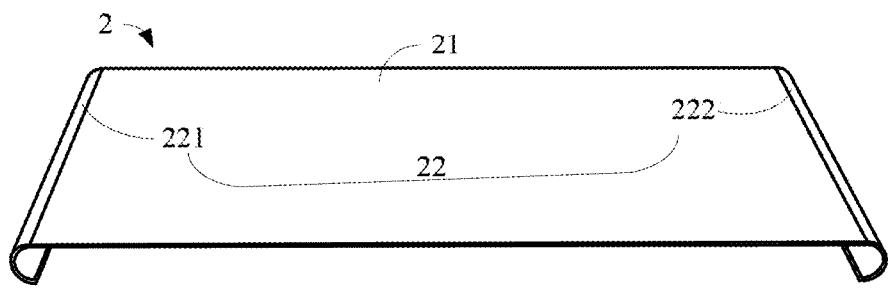
FIG. 8 is a schematic structural view illustrating a flexible panel according to an exemplary embodiment.

In an embodiment, as shown in FIG. 8, the light transmitting region 22 may include a first light transmitting region 221 and a second light transmitting region 222. The first light transmitting region 221 is connected to one side of the display region 21, and the second light transmitting region 222 is connected to the other side of the display region 21 opposite to the first light transmitting region 221. The first rotation shaft 3211 may wind at least a portion of the first light transmitting region 221, and the second rotation shaft 3212 may wind at least a portion of the second light transmitting region 222. In this way, the display region 21 may be driven to move relative to the device body 1 through the rotation of the rotation shafts 3211, 3212 and the winding of the light transmitting regions 221, 222. Moreover, since the light transmitting regions may be disposed on both sides of the display region 21, the requirement for the position of the sensor components 11 may be reduced, which is advantageous to optimizing the internal layout of the electronic device 100.

Figure 9:
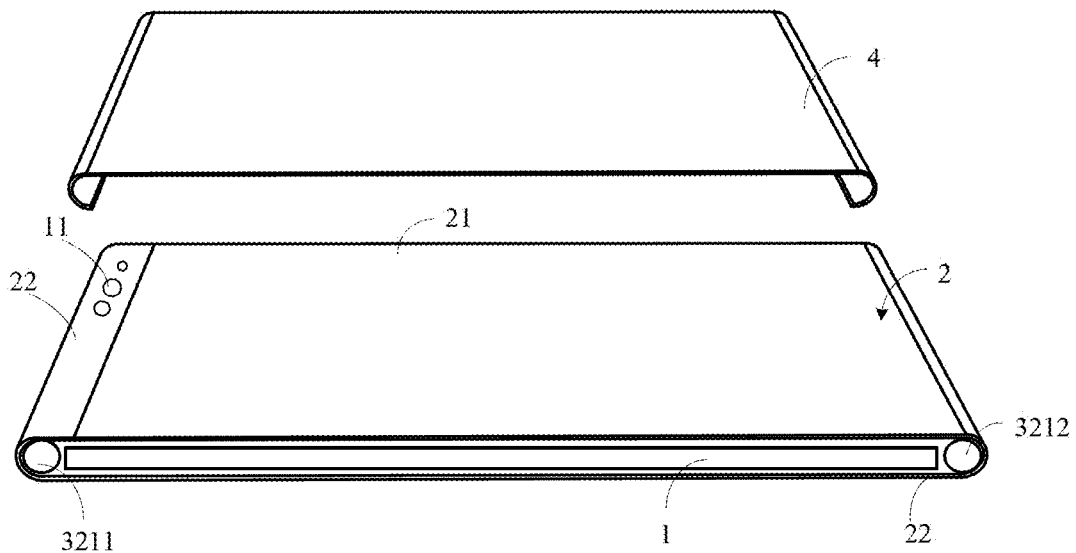
FIG. 9 is a schematic exploded view illustrating yet another electronic device according to an exemplary embodiment.

In another embodiment, as shown in FIG. 9, two sides of the light transmitting region 22 are respectively connected with the two sides of the display region 21 to form the flexible panel 2 of a ring shape, and the device body 1 may be surrounded by the flexible panel 2. Furthermore, in a state where the light transmitting region 22 covers the sensor components 11, there may exist two different states:

A first state is that a portion of the display region 21 and a portion of the light transmitting region 22 are located on a same side of the electronic device 100. At this time, the state of the display region 21 located on the same side as the light transmitting region 22 may be adjusted according to light detected by the sensor components 11. In this case, the sensor components 11 may be working normally on this side while the display region 21 performs a display operation on the side. For example, when the sensor component 11 is a camera module, a self-shooting function of the electronic device 100 may be implemented in this state.

A second state is that the display region 21 and the light transmitting region 22 are located on opposite sides of the electronic device 100. When the sensor component 11 is a camera module, a rear shooting function of the electronic device 100 may be implemented. Based on this, the implementation of the front shooting function and the rear shooting function of the electronic device 100 through the same camera module may reduce the cost and optimize the internal space of the electronic device 100.

Further, still as shown in FIG. 9, the electronic device 100 may include a light transmitting cover plate 4. The light transmitting cover plate 4 is assembled to the device body 1 and configured to cover the flexible panel 2. The flexible panel 2 may be located between the light transmitting cover plate 4 and the device body 1, and the flexible panel 2 is movable relative to the light transmitting cover plate 4 under the driving of the rotation shaft 3. In this case, the flexible panel 2 may be protected by the light transmitting cover plate 4, which is advantageous to extending the service life of the electronic device 100.

Figure 10:
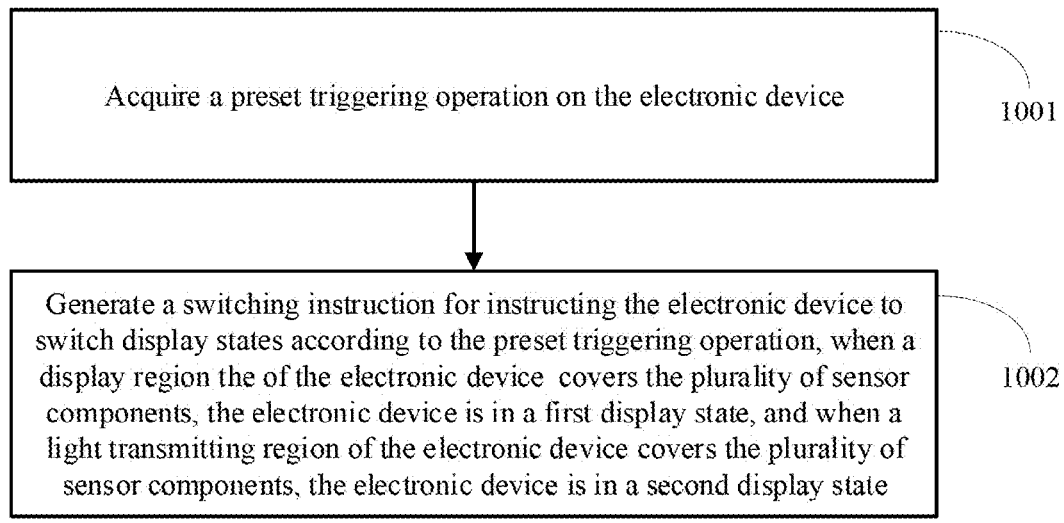
FIG. 10 is a flow chart illustrating a method of controlling a flexible panel according to an exemplary embodiment.

Based on the electronic device described in the foregoing embodiments, the present disclosure further provides a method of controlling a flexible panel. As shown in FIG. 10, the method may include the following steps 1001-1002.

At step 1001, a preset triggering operation on the electronic device is acquired.

At step 1002, a switching instruction is generated according to the preset triggering operation. The switching instruction is used for instructing the electronic device to switch display states. When a display region of the electronic device covers the plurality of sensor components, the electronic device is in a first display state, and when a light transmitting region of the electronic device covers the plurality of sensor components, the electronic device is in a second display state.

Figure 11:
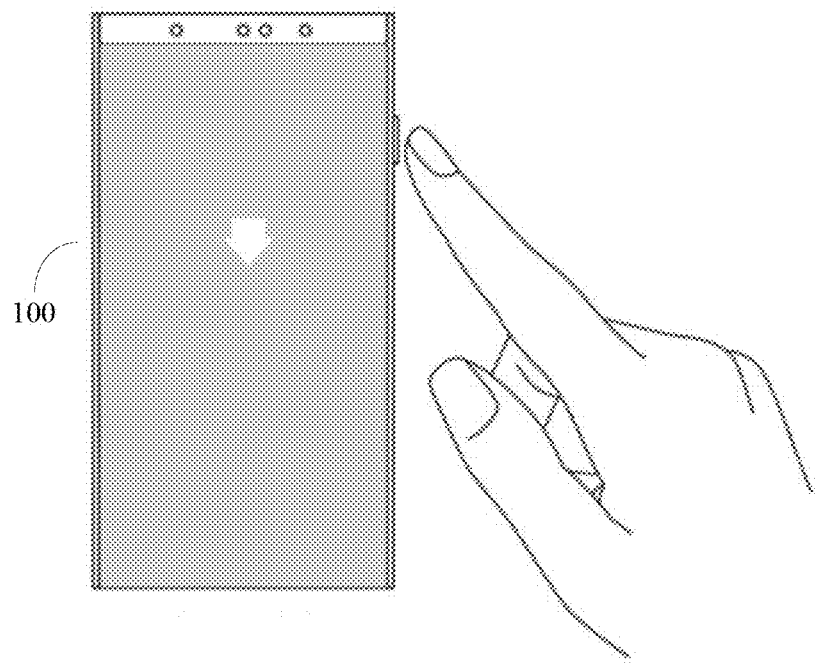
FIG. 11 is an application scenario view illustrating an electronic device according to an exemplary embodiment.

In this embodiment, the preset triggering operation may include an operation performed by a user on the electronic device 100. In an embodiment, as shown in FIG. 11, when a user presses a preset physical key on the electronic device 100, other sensor inside the electronic device 100 may detect the press operation. Upon detection of the press operation, the other sensor inside the electronic device 100 may report it to a controller such that the controller generates a drive instruction according to the operation, and the electronic device 100 may switch display states based on the drive instruction. The preset physical key may include one key or a combination of multiple physical keys, and the present disclosure has no limitation thereto.

Figure 12:
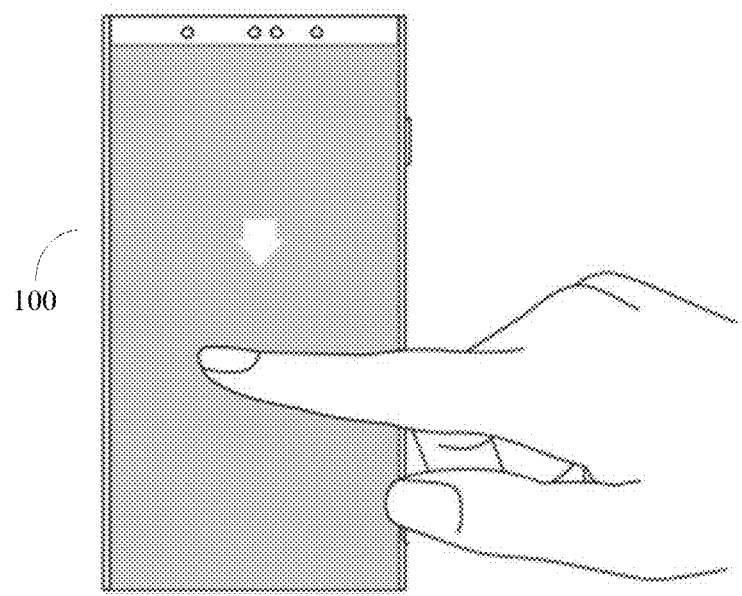
FIG. 12 is an application scenario view illustrating another electronic device according to an exemplary embodiment.

In another embodiment, as shown in FIG. 12, when a user performs a preset touch operation on the electronic device 100, the controller may acquire the preset touch operation performed by the user on the electronic device 100, thereby switching the display states of the electronic device 100. For example, when the user slides down as shown in FIG. 12, the electronic device 100 may switch from the first display state to the second display state. Correspondingly, when the user slides up, the electronic device 100 may switch from the second display state to the first display state.

Figure 13:
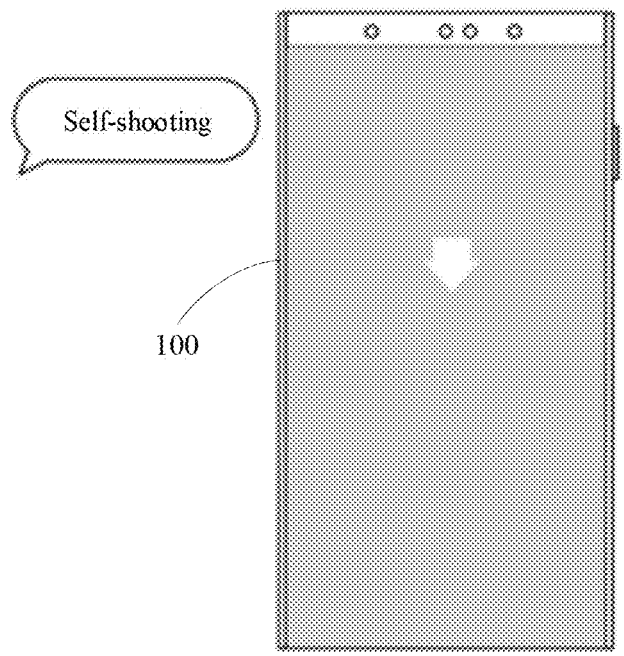
FIG. 13 is an application scenario view illustrating still another electronic device according to an exemplary embodiment.

In still another embodiment, as shown in FIG. 13, the controller may also switch the display states of the electronic device 100 when acquiring a preset voice signal. For example, when acquiring a "self-shooting" voice signal, the electronic device 100 may switch from the first display state to the second display state. Of course, it is also possible to switch the display states when a voice signal includes other keywords. For example, when acquiring keywords "full screen display", the electronic device 100 may switch from the second display state to the first display state.

In some embodiments, the controller may also switch the display states of the electronic device 100 when acquiring an operation of touching a preset virtual key on the electronic device 100 by a user, which will not be described herein again. The electronic device 100 may include one or more of a mobile phone terminal, a tablet computer, and an electronic reader. It is to be noted that in some other embodiments, when a plurality of preset triggering operations as described above are detected at the same time, a triggering condition for the electronic device 100 to switch the display states is to be satisfied.

In the above embodiments, the switching instruction may include indication information for indicating a moving direction and a moving distance of the flexible panel. Specifically, after detecting the preset triggering operation, the moving direction and the moving distance of the flexible panel may be determined, and then the switching instruction is generated according to the moving direction and the moving distance. The moving distance may be a default setting in the electronic device 100, and the moving direction is determined according to current display state of the electronic device 100 and key information included in the preset triggering operation. For example, when it is determined that the electronic device 100 is currently in the first display state and the key information "front shooting" included in the preset triggering operation is extracted, the flexible panel 2 may be adjusted such that the light transmitting region 22 covers a plurality of sensor components 11, and a portion of the display region 21 and the light transmitting region 22 are located on the same side of the electronic device 100; or, when it is determined that the electronic device 100 is currently in the first display state and the key information "rear shooting" included in the preset triggering operation is extracted, the flexible panel 2 may be adjusted such that the light transmitting region 22 covers a plurality of sensor components 11, and the display region 21 and the light transmitting region 22 are located on opposite sides of the electronic device 100.

Corresponding to the embodiment of the method of controlling a flexible panel, the present disclosure also provides an embodiment of an apparatus for controlling a flexible panel.

Figure 14:
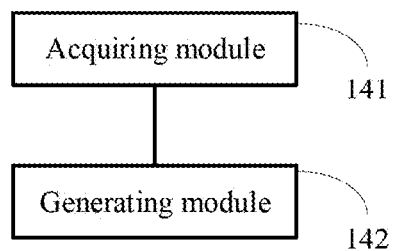
FIG. 14 is a block diagram illustrating an apparatus for controlling a flexible panel according to an exemplary embodiment.

FIG. 14 is a block diagram illustrating an apparatus for controlling a flexible panel according to an exemplary embodiment. This apparatus may be applied to an electronic device 100. The electronic device 100 includes sensor components 11 and a flexible panel 2. Referring to FIG. 14, the apparatus includes an acquiring module 141 and a generating module 142.

The acquiring module 141 is configured to acquire a preset triggering operation on the electronic device.

The generating module 142 is configured to generate a switching instruction according to the preset triggering operation. The switching instruction is used for instructing the electronic device to switch display states;

When a display region 21 of the electronic device 100 covers a plurality of sensor components 11, the electronic device 100 is in a first display state, and when a light transmitting region 22 of the electronic device 100 covers the plurality of sensor components 11, the electronic device 100 is in a second display state.

Figure 15:
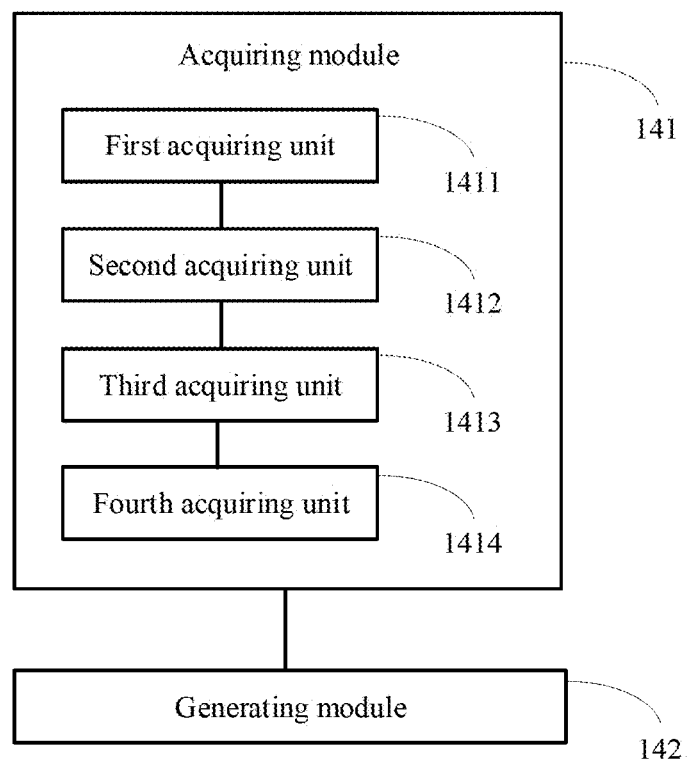
FIG. 15 is a block diagram illustrating an apparatus for controlling another flexible panel according to an exemplary embodiment.

Further, as shown in FIG. 15, the acquiring module 141 may include a first acquiring unit 1411, a second acquiring unit 1412, a third acquiring unit 1413, and a fourth acquiring unit 1414.

The first acquiring unit 1411 is configured to acquire an operation of pressing a preset physical key on the electronic device by a user.

The second acquiring unit 1412 is configured to acquire a preset touch operation performed by a user on the electronic device.

The third acquiring unit 1413 is configured to acquire a preset voice signal input by a user into the electronic device.

The fourth acquiring unit 1414 is configured to acquire an operation of touching a preset virtual key on the electronic device by a user.

Of course, it is to be noted that, in some other embodiments, the acquiring module 141 may also include one or more of the first acquiring unit 1411, the second acquiring unit 1412, the third acquiring unit 1413 and the fourth acquiring unit 1414, or a combination thereof, and the present disclosure has no limitation thereto.

Figure 16:
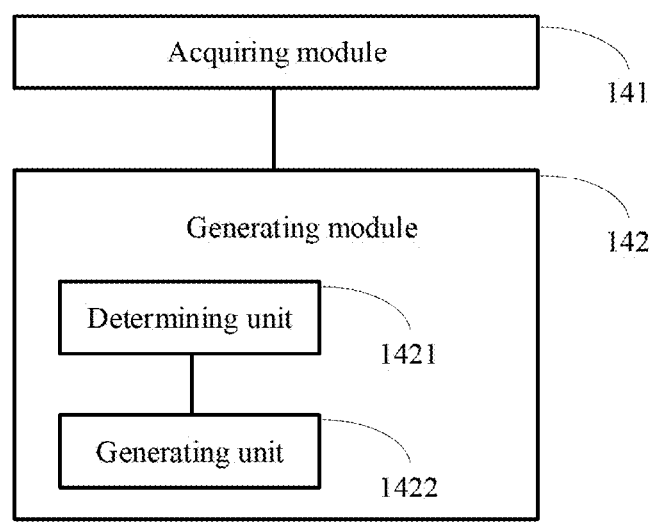
FIG. 16 is a block diagram illustrating an apparatus for controlling a flexible panel according to an exemplary embodiment.

Further, as shown in FIG. 16, the generating module 142 may include a determining unit 1421 and a generating unit 1422.

The determining unit 1421 is configured to determine a moving direction and a moving distance of the flexible panel.

The generating unit 1422 is configured to generate the switching instruction according to the moving direction and the moving distance of the flexible panel.

It is to be noted that the configuration of the determining unit 1421 and the generating unit 1422 in the apparatus embodiment shown in FIG. 16 may also be included in the apparatus embodiment in FIG. 15, and the present disclosure has no limitation thereto.

With regard to the apparatus in the above embodiments, the specific manner in which respective modules perform operations has been described in detail in the embodiments relating to the method, and will not be explained in detail herein.

Since the apparatus examples substantially correspond to the method examples, a reference may be made to part of the method examples. The apparatus examples described above are merely illustrative, where the units described as separate components may be or not be physically separated, and the components displayed as units may be or not be physical units, i.e., may be located in one place, or may be distributed in a plurality of network units. Part or all of the modules may be selected according to actual needs to implement the objectives of the present disclosure. Those of ordinary skill in the art may understand and carry out the present disclosure without creative effort.

Correspondingly, the present disclosure further provides an apparatus of controlling a flexible panel, applied to an electronic device. The electronic device includes a plurality of sensor components; a flexible panel including a display region and a light transmitting region connected to the display region; one or more processors; and a memory configured to store processor executable instructions, where the processors are configured to: acquire a preset triggering operation on the electronic device; and generate a switching instruction for instructing the electronic device to switch display states according to the preset triggering operation. When the display region of the electronic device covers the plurality of sensor components, the electronic device is in a first display state, and when the light transmitting region of the electronic device covers the plurality of sensor components, the electronic device is in a second display state.

Correspondingly, the present disclosure also provides a terminal, including a memory, and one or more programs, where the one or more programs are stored in the memory and configured to execute, by one or more processors, instructions included therein for performing the following operations: acquiring a preset triggering operation on an electronic device; and generating a switching instruction for instructing the electronic device to switch display states according to the preset triggering operation. When a display region of the electronic device covers a plurality of sensor components, the electronic device is in a first display state, and when a light transmitting region of the electronic device covers the plurality of sensor components, the electronic device is in a second display state.

Figure 17:
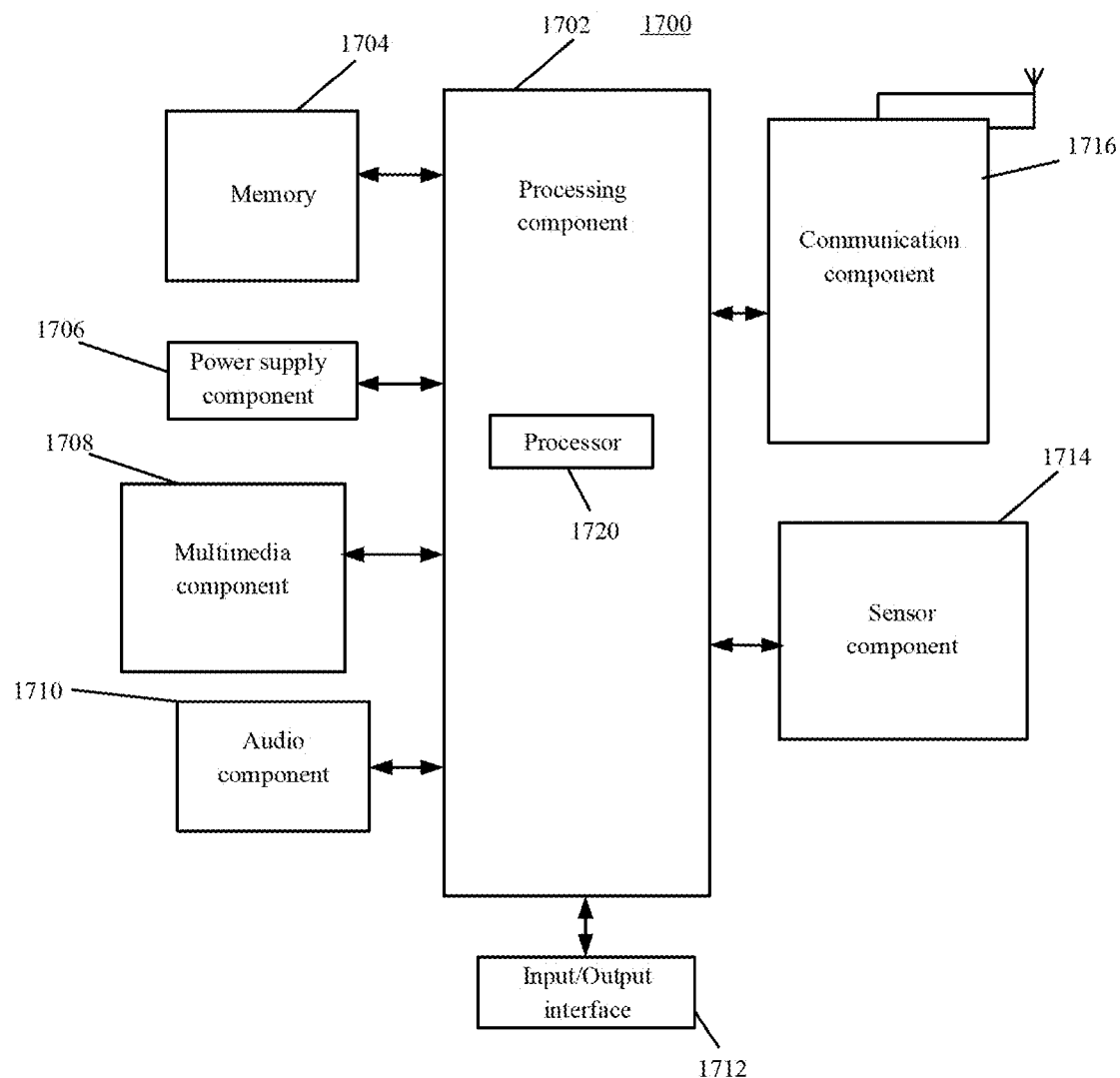
FIG. 17 is a block diagram illustrating an apparatus for a method of controlling a flexible panel according to an exemplary embodiment.

FIG. 17 is a block diagram illustrating an apparatus 1700 for a method of controlling a flexible panel according to an exemplary embodiment. For example, the apparatus 1700 may be a mobile phone, a computer, a digital broadcast terminal, a messaging sending and receiving device, a game console, a tablet device, a medical device, a fitness device, a personal digital assistant, etc.

Referring to FIG. 17, the apparatus 1700 may include one or more of the following components: a processing component 1702, a memory 1704, a power supply component 1706, a multimedia component 1708, an audio component 1710, an input/output (I/O) interface 1712, a sensor component 1714, and a communication component 1716.

The processing component 1702 usually controls overall operations of the apparatus 1700, such as operations relating to display, telephone calls, data communications, camera operations, and recording operations. The processing component 1702 may include one or more processors 1720 for executing instructions to perform all or part of steps of the above methods. Further, the processing component 1702 may include one or more modules to facilitate interaction between the processing component 1702 and other components. For example, the processing component 1702 may include a multimedia module to facilitate interaction between the multimedia component 1708 and the processing component 1702

The memory 1704 is configured to store various types of data to support operations at the apparatus 1700. Examples of these data include instructions, such as contact data, phone book data, messages, pictures, videos, and the like for any application or method that operates on the apparatus 1700. The memory 1704 may be implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read Only Memory (PROM), a Read Only Memory (ROM), a magnetic memory, a flash memory, a disk or an optical disk.

The power supply component 1706 supplies power for various components of the apparatus 1700. The power supply component 1706 may include a power supply management system, one or more power supplies, and other components associated with generating, managing and distributing power for the apparatus 1700.

The multimedia component 1708 includes a screen for providing an output interface between the apparatus 1700 and a user. In some examples, the screen may include a Liquid Crystal Display (LCD) and a Touch Panel (TP). If the screen includes a touch panel, the screen may be implemented as a touch screen for receiving input signals from the user. The touch panel may include one or more touch sensors for sensing touches, slides, and gestures on the touch panel. The touch sensor may not only sense a boundary of touching or sliding actions but also detect duration and pressure associated with the touching or sliding operations. In some examples, the multimedia component 1708 may include a front camera and/or a rear camera. When the apparatus 1700 is in an operation mode, such as a shooting mode or a video mode, the front camera and/or the rear camera may receive external multimedia data. Each of the front camera and rear camera may be a fixed optical lens system or be capable of a focal length and an optical zoom capability.

The audio component 1710 is configured to output and/or input audio signals. For example, the audio component 1710 includes a microphone (MIC). When the apparatus 1700 is in an operation mode, such as a call mode, a record mode, and a voice recognition mode, the microphone is configured to receive an external audio signal. The received audio signal may be further stored in the memory 1704 or sent via the communication component 1716. In some examples, the audio component 1710 further includes a speaker for outputting an audio signal.

The I/O interface 1712 provides an interface between the processing component 1702 and a peripheral interface module. The above peripheral interface module may be a keyboard, a click wheel, a button, or the like. These buttons may include but not limited to, a home button, a volume button, a start button, and a lock button.

The sensor component 1714 includes one or more sensors for providing a status assessment in various aspects to the apparatus 1700. For example, the sensor component 1714 may detect an on/off state of the apparatus 1700, and a relative location of components, for example, the components are a display and a keypad of the apparatus 1700. The sensor component 1714 may also detect a position change of the apparatus 1700 or a component of the apparatus 1700, presence or absence of a touch of a user on the apparatus 1700, an orientation or acceleration/deceleration of the apparatus 1700 and a temperature change of the apparatus 1700. The sensor component 1714 may include a proximity sensor for detecting the existence of nearby objects without any physical contact. The sensor component 1714 may further include an optical sensor, such as a CMOS or CCD image sensor used in imaging applications. In some examples, the sensor component 1714 may further include an acceleration sensor, a gyro sensor, a magnetic sensor, a pressure sensor, or a temperature sensor.

The communication component 1716 is configured to facilitate wired or wireless communication between the apparatus 1700 and other devices. The apparatus 1700 may access a wireless network based on a communication standard, such as WiFi, 2G or 3G, 4G LTE, 5G NR or a combination thereof. In an example, the communication component 1716 receives broadcast signals or broadcast associated information from an external broadcast management system via a broadcast channel. In an example, the communication component 1716 may further include a Near Field Communication (NFC) module for promoting short-range communication. For example, the NFC module may be implemented based on Radio Frequency Identification (RFID) technology, an Infrared Data Association (IrDA) technology, an Ultra-Wide band (UWB) technology, a Bluetooth (BT) technology, and other technologies.

In an example, the apparatus 1700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGA), controllers, microcontrollers, microprocessors or other electronic elements for executing the above methods.

In an example, there is further provided a non-transitory computer readable storage medium including instructions, such as a memory 1704 including instructions. The above instructions may be executed by the processor 1720 of the apparatus 1700 to complete the above method. For example, the non-transitory computer readable storage medium may be a Read-Only Memory (ROM), a Random-Access Memory (RAM), a CD-ROM, a magnetic tape, a floppy disk and an optical data storage device, etc.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only and the real scope and spirit of the present disclosure are indicated by the claims of the present disclosure.

It is to be understood that the present disclosure is not limited to the precise structures that have described and shown in the drawings, and various modifications and changes can be made without departing from the scope thereof. The scope of the disclosure is to be limited only by the appended claims.

What is claimed is:

1. An electronic device, comprising: a device body comprising a plurality of sensor components arranged in a longitudinal line along a first direction; a flexible panel comprising a display region and a light transmitting region connected with the display region; and a drive mechanism, configured to drive the flexible panel to move along a second direction so that the light transmitting region covers the plurality of sensor components when at least one of the plurality of sensor components is in a light sensing state, wherein the first direction is perpendicular to the second direction, wherein the drive mechanism comprises: a drive motor; and a transmission device mating with the drive motor and comprising a transmission component that engages with the flexible panel; the light transmitting region comprises a first light transmitting region connected with one side of the display region and a second light transmitting region connected with the other side of the display region opposite to the first light transmitting region to form the flexible panel of a ring shape; the transmission component comprises a first transmission component winding at least a portion of the first light transmitting region and a second transmission component winding at least a portion of the second light transmitting region.

2. The electronic device according to claim 1, wherein the transmission component comprises at least one of:
a plurality of rotation shafts, a plurality of tracks or a plurality of belts arranged in parallel.

3. The electronic device according to claim 1, further comprising:
a light transmitting cover plate assembled to the device body and configured to cover the flexible panel, wherein, the flexible panel is located between the light transmitting cover plate and the device body, and the flexible panel is movable relative to the light transmitting cover plate.

4. The electronic device according to claim 1, wherein the plurality of the sensor components comprise at least one of:
a camera module, a distance sensing module, an ambient light sensing module, or a face recognition module.

5. The electronic device according to claim 1, the first transmission component is a first rotation shaft and the second transmission component is a second rotation shaft, and when the first rotation shaft and the second rotation shaft are rotating in a clockwise direction, the display region moves from the one side to the other side, the light transmitting region synchronously moves from the one side to the other side, the display region away from the plurality of sensor components and the light transmitting region cover the plurality of sensor components.

6. The electronic device according to claim 5, when the first rotation shaft and the second rotation shaft are rotating in a counter-clockwise direction, the display region moves from the other side to the one side, and the light transmitting region synchronously moves from the other side to the one side, the light transmitting region away from the sensor components and the display region cover the sensor components.

* * * * *